United States Patent
Borsella et al.

(10) Patent No.: US 8,730,886 B2
(45) Date of Patent: May 20, 2014

(54) METHODS AND APPARATUS FOR REGISTRATION AND DATA TRANSMISSION USING FAST/ZERO CONTENTION RESOLUTION

(75) Inventors: Remo Borsella, Waterloo (CA); David Philip Hole, Southampton (GB); Rene Faurie, Courbevoie (FR); Satish Venkob, Waterloo (CA); Steven Michael Hanov, Waterloo (CA); Werner Karl Kreuzer, Baiern (DE)

(73) Assignee: BlackBerry Limited, Waterloo, Ontario ( * ) Notice: Subject to any disclaimer, the term of this patent is extended or adjusted under 35 U.S.C. 154(b) by 212 days.

(21) Appl. No.: 13/045,165

(22) Filed: Mar. 10, 2011

(65) Prior Publication Data

US 2011/0222492 A1    Sep. 15, 2011

(30) Foreign Application Priority Data

Mar. 12, 2010 (EP) .................... 10290130

(51) Int. Cl.
*H04W 4/00* (2009.01)
(52) U.S. Cl.
USPC .......................................... 370/329
(58) Field of Classification Search
USPC .............. 370/312, 328, 329, 431, 310, 310.2, 370/336, 465, 468
See application file for complete search history.

(56) References Cited

U.S. PATENT DOCUMENTS

| | | | |
|---|---|---|---|
| 5,818,829 A | 10/1998 | Raith et al. | |
| 6,633,559 B1 | 10/2003 | Asokan et al. | |
| 6,772,112 B1 | 8/2004 | Ejzak | |
| 6,870,858 B1 | 3/2005 | Sebire | |
| 6,963,544 B1 | 11/2005 | Balachandran et al. | |
| 7,392,051 B2 | 6/2008 | Rajala et al. | |
| 7,433,334 B2 | 10/2008 | Marjelund et al. | |
| 7,843,895 B2 | 11/2010 | Park et al. | |
| 8,085,725 B2 | 12/2011 | Zhou | |
| 8,238,895 B2 | 8/2012 | Sorbara et al. | |
| 8,243,667 B2 | 8/2012 | Chun et al. | |
| 8,284,725 B2 | 10/2012 | Ahmadi | |
| 8,363,671 B2 | 1/2013 | Korhonen et al. | |

(Continued)

FOREIGN PATENT DOCUMENTS

| | | |
|---|---|---|
| EP | 0951192 | 10/1999 |
| EP | 1791307 | 5/2007 |

(Continued)

OTHER PUBLICATIONS

European Patent Office, "Extended European Search Report," issued in connection with EP Application No. 10290130.3, dated Aug. 30, 2010, (8 pages).

(Continued)

*Primary Examiner* — Anh Ngoc Nguyen
(74) *Attorney, Agent, or Firm* — Hanley, Flight and Zimmerman, LLC

(57) ABSTRACT

Example methods and apparatus for registration and data transmission using fast/zero contention resolution are disclosed. An example method for transmission on a random-access channel (RACH) involves transmitting a mobile station radio access capabilities (MS RAC) message to a network and receiving an identification (ID) from the network subsequent to the MS RAC. The ID is locally unique and provides contention resolution. A timing advance is determined and further transmissions are performed on the RACH using the ID and the TA.

20 Claims, 10 Drawing Sheets

Timing of Access Burst

(56) References Cited

U.S. PATENT DOCUMENTS

| | | |
|---|---|---|
| 2002/0080758 A1 | 6/2002 | Landais |
| 2002/0126630 A1 | 9/2002 | Vanttinen et al. |
| 2003/0002457 A1 | 1/2003 | Womack et al. |
| 2003/0117995 A1 | 6/2003 | Koehn et al. |
| 2003/0133426 A1 | 7/2003 | Schein et al. |
| 2004/0077348 A1 | 4/2004 | Sebire et al. |
| 2004/0184440 A1 | 9/2004 | Higuchi et al. |
| 2004/0196826 A1 | 10/2004 | Bao et al. |
| 2004/0248575 A1 | 12/2004 | Rajala et al. |
| 2005/0030919 A1 | 2/2005 | Lucidarme et al. |
| 2006/0035634 A1 | 2/2006 | Swann et al. |
| 2006/0072520 A1 | 4/2006 | Chitrapu et al. |
| 2007/0064665 A1 | 3/2007 | Zhang et al. |
| 2007/0115816 A1 | 5/2007 | Sinivaara |
| 2007/0147326 A1 | 6/2007 | Chen |
| 2007/0149206 A1 | 6/2007 | Wang et al. |
| 2007/0165567 A1 | 7/2007 | Tan et al. |
| 2007/0224990 A1 | 9/2007 | Edge et al. |
| 2007/0265012 A1 | 11/2007 | Sorbara et al. |
| 2007/0291696 A1 | 12/2007 | Zhang et al. |
| 2008/0049708 A1 | 2/2008 | Khan et al. |
| 2008/0080627 A1 | 4/2008 | Korhonen et al. |
| 2008/0084849 A1 | 4/2008 | Wang et al. |
| 2008/0107055 A1 | 5/2008 | Sim et al. |
| 2008/0188220 A1 | 8/2008 | DiGirolamo et al. |
| 2008/0225785 A1* | 9/2008 | Wang et al. .................. 370/329 |
| 2008/0240028 A1 | 10/2008 | Ding et al. |
| 2008/0267127 A1 | 10/2008 | Narasimha et al. |
| 2008/0273610 A1* | 11/2008 | Malladi et al. ............... 375/260 |
| 2009/0046676 A1 | 2/2009 | Krishnaswamy et al. |
| 2009/0109937 A1 | 4/2009 | Cave et al. |
| 2009/0141685 A1 | 6/2009 | Berglund |
| 2009/0197587 A1 | 8/2009 | Frank |
| 2009/0201868 A1 | 8/2009 | Chun et al. |
| 2009/0232107 A1 | 9/2009 | Park et al. |
| 2009/0233615 A1 | 9/2009 | Schmitt |
| 2009/0252125 A1 | 10/2009 | Vujcic |
| 2010/0041393 A1 | 2/2010 | Kwon et al. |
| 2010/0054235 A1 | 3/2010 | Kwon et al. |
| 2010/0074246 A1 | 3/2010 | Harada et al. |
| 2010/0099393 A1 | 4/2010 | Brisebois et al. |
| 2010/0112992 A1 | 5/2010 | Stadler et al. |
| 2010/0120443 A1 | 5/2010 | Ren |
| 2010/0130220 A1 | 5/2010 | Laroia et al. |
| 2010/0159919 A1 | 6/2010 | Wu |
| 2010/0202354 A1 | 8/2010 | Ho |
| 2010/0220713 A1 | 9/2010 | Tynderfeldt et al. |
| 2010/0254356 A1 | 10/2010 | Tynderfeldt et al. |
| 2010/0284376 A1 | 11/2010 | Park et al. |
| 2011/0038361 A1 | 2/2011 | Park et al. |
| 2012/0250659 A1 | 10/2012 | Sambhwani |

FOREIGN PATENT DOCUMENTS

| | | |
|---|---|---|
| EP | 2023548 | 2/2009 |
| EP | 2034755 | 3/2009 |
| EP | 2043391 | 4/2009 |
| EP | 2101538 | 9/2009 |
| EP | 2104339 | 9/2009 |
| EP | 2187578 | 5/2010 |
| FR | 2831009 | 4/2003 |
| GB | 2448889 | 11/2008 |
| TW | 200614735 | 5/2006 |
| TW | 201026131 | 7/2010 |
| WO | 94/05095 | 3/1994 |
| WO | 98/26625 | 6/1998 |
| WO | 00/54536 | 9/2000 |
| WO | 0079823 | 12/2000 |
| WO | 01/11907 | 2/2001 |
| WO | 01/17283 | 3/2001 |
| WO | 01/63839 | 8/2001 |
| WO | 2005039201 | 4/2005 |
| WO | 2007/109695 | 9/2007 |
| WO | 2008097626 | 8/2008 |
| WO | 2008136488 | 11/2008 |
| WO | 2009/059518 | 5/2009 |
| WO | 2009/088873 | 7/2009 |
| WO | 2009155833 | 12/2009 |

OTHER PUBLICATIONS

Patent Cooperation Treaty, "International Search Report," issued by the International Searching Authority in connection with PCT application No. PCT/IB2011/051004, mailed Jun. 1, 2011 (4 pages).

Patent Cooperation Treaty, "Written Opinion of the International Searching Authority," issued by the International Searching Authority in connection with PCT/IB2011/051004, mailed Jun. 1, 2011 (9 pages).

"3rd Generational Partnership Project; Group Core Network and Terminals; Mobile radio interface Layer 3 specification; Core network protocols; Stage 3 (Release 9)," 3GPP TS 24.008 V9.1.0, Dec. 18, 2009, (595 pages).

Panasonic: "DRX and DTX Operation in LTE_Active," 3GPP Draft; R2-060888, 3rd Generation Partnership Project (3GPP), Athens, Greece, Mar. 27-31, 2006, 3 pages.

"3rd Generational Partnership Project; Technical Specification Group GSM/EDGE Radio Access Network; Mobile radio interface layer 3 specification; Radio Resource Control (RRC) protocol (Release 9)," 3GPP TS 44.018 V9.3.0, Dec. 18, 2009, (428 pages).

"3rd Generational Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 9)," 3GPP TS 44.060 V9.2.0, Dec. 18, 2009, (596 pages).

LG Electronics: "Uplink resource request for uplink scheduling," 3GPP Draft; R1-060922 UL Request_With TP, 3rd Generation Partnership Project (3GPP), Athens, Greece, Mar. 27-31, 2006, 4 pages.

"3rd Generational Partnership Project; Technical Specification Group Services and System Aspects; Vocabulary for 3GPP Specifications (Release 9)," 3GPP TR 21.905 V9.4.0, Dec. 19, 2009, (57 pages).

"3rd Generational Partnership Project; Technical Specification Group GSM/EDGE Radio Access Network; Radio Subsystem Synchronization (Release 9)," 3GPP TS 45.010 V9.0.0, Nov. 2009, (31 pages).

"3rd Generational Partnership Project; Technical Specification Group GSM/EDGE Radio Access Network; Channel Coding (Release 9)," 3GPP TS 45.003 V9.0.0, Dec. 2009, (321 pages).

"3rd Generational Partnership Project; Technical Specification Group GSM/EDGE Radio Access Network; Multiplexing and Multiple Access on the Radio Path (Release 9)," 3GPP TS 45.002 V9.2.0, Nov. 2009, (108 pages).

European Patent Office, "Communication pursuant to Article 94(3) EPC," issued in connection with European Application No. 10290130.3, dated Nov. 13, 2012, (5 pages).

Patent Cooperation Treaty, "International Preliminary Report on Patentability," issued by the International Searching Authority in connection with PCT application No. PCT/IB2011/051004, dated Sep. 18, 2012 (9 pages).

Taiwan Patent Office, "Office Action," issued in connection with Taiwan Patent Application No. 100108161 on Jul. 19, 2013, 10 pages.

F. Andreasen, "Session Description Protocol (SDP) Simple Capability Declaration," Network Working Group, RFC 3407, Oct. 2002, 11 pages.

"Long Term Evolution Protocol Overview," Freescale Semiconductor, document No. LTEPTCLOVWWP, Oct. 2008, 21 pages.

* cited by examiner

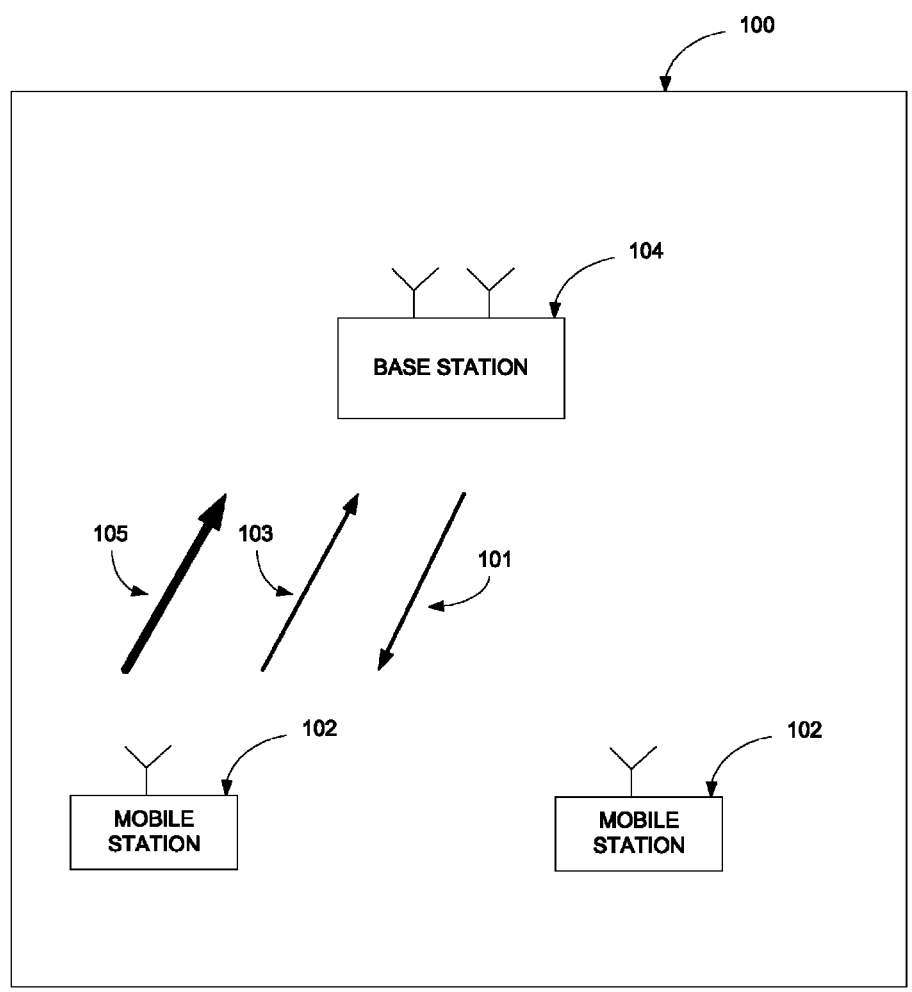
FIG. 1 – Wireless Network

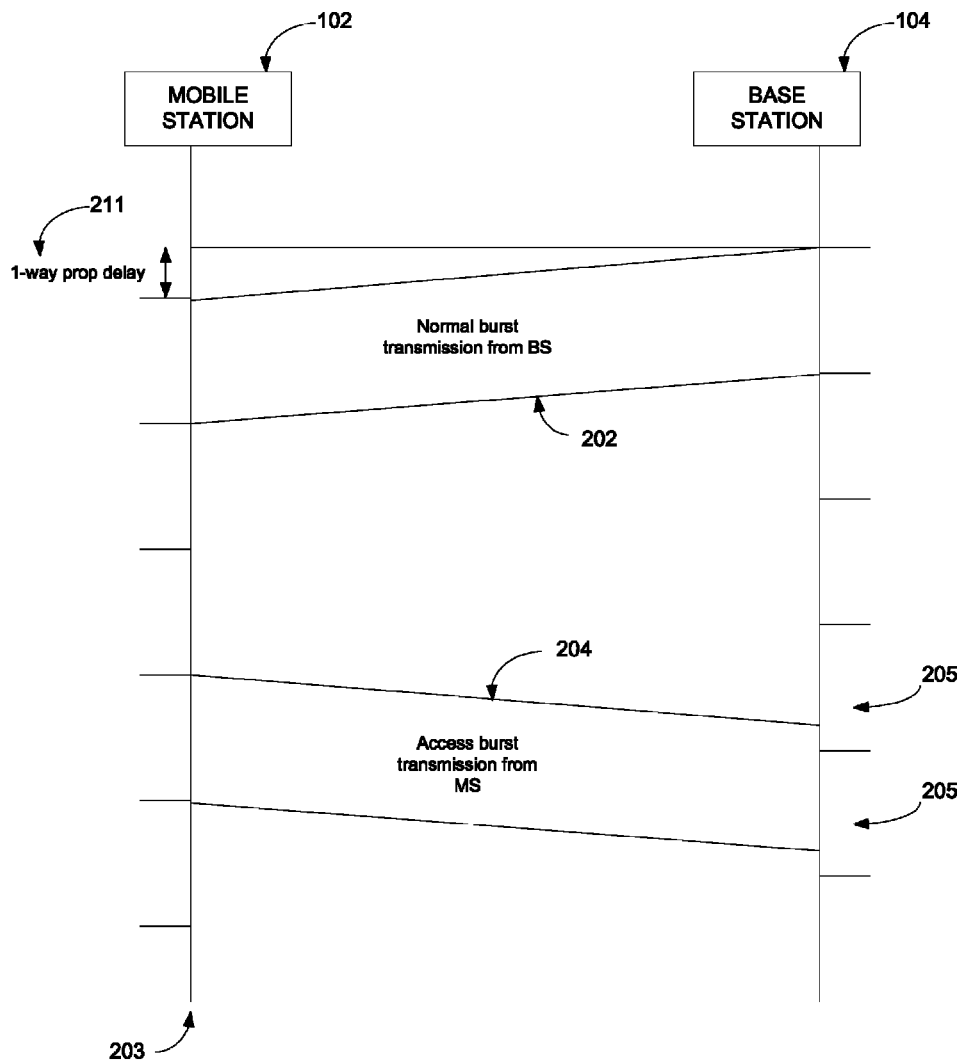
FIG. 2 – Timing of Access Burst

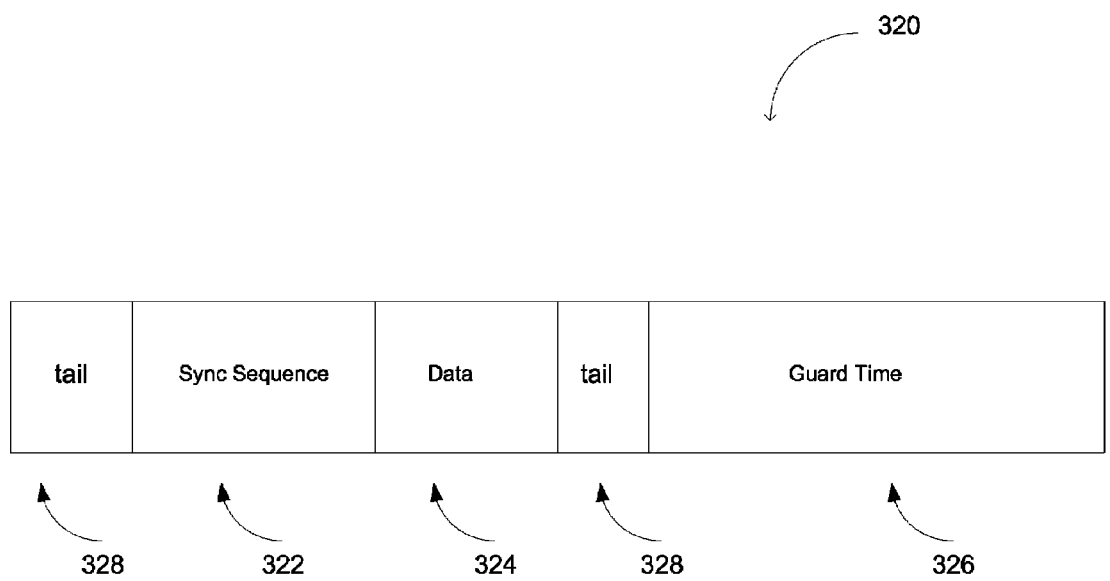
FIG. 3 – Legacy Access Burst Structure

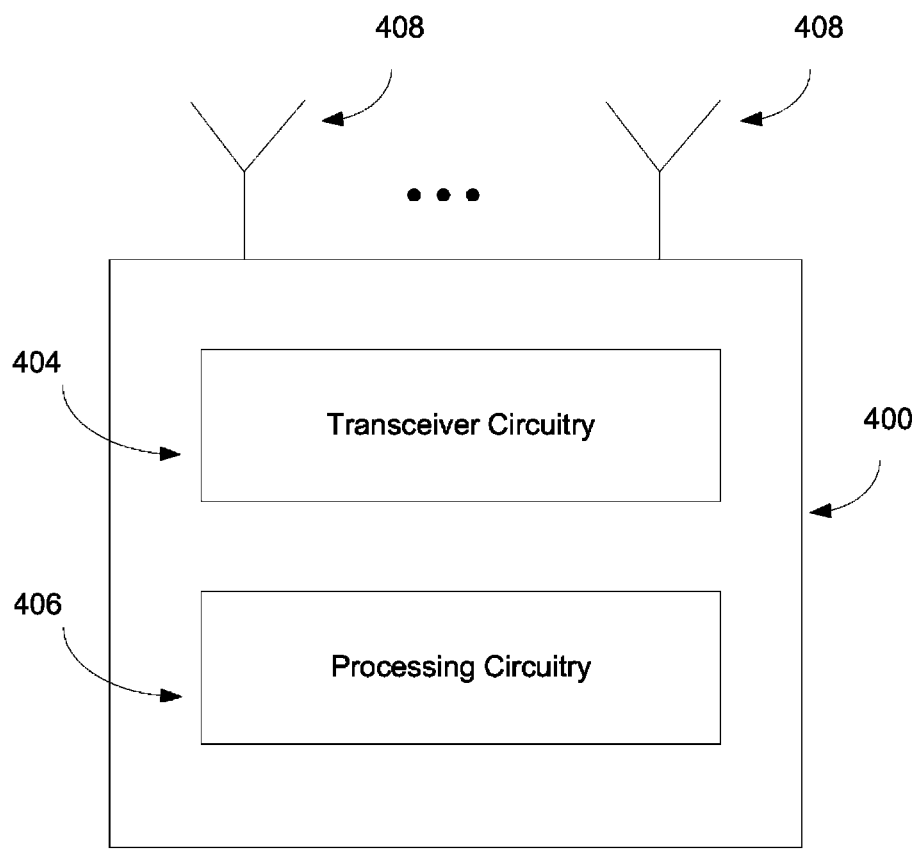
FIG. 4 – Mobile Station

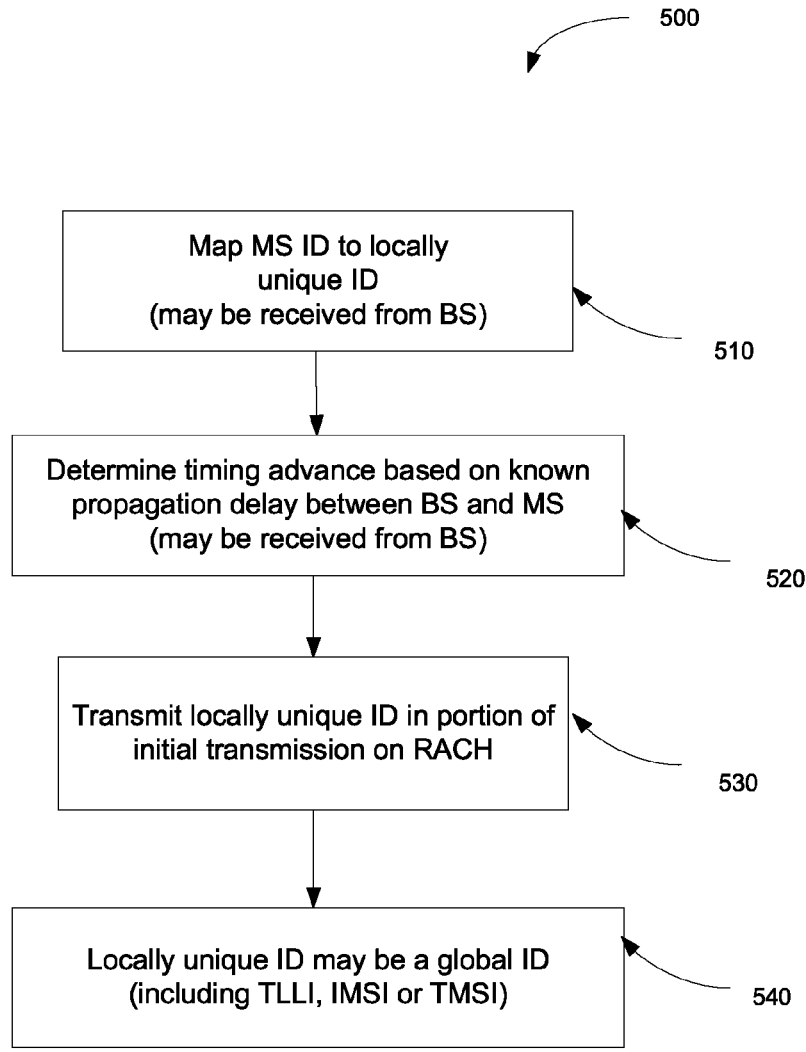
FIG. 5 – Fast Contention Resolution

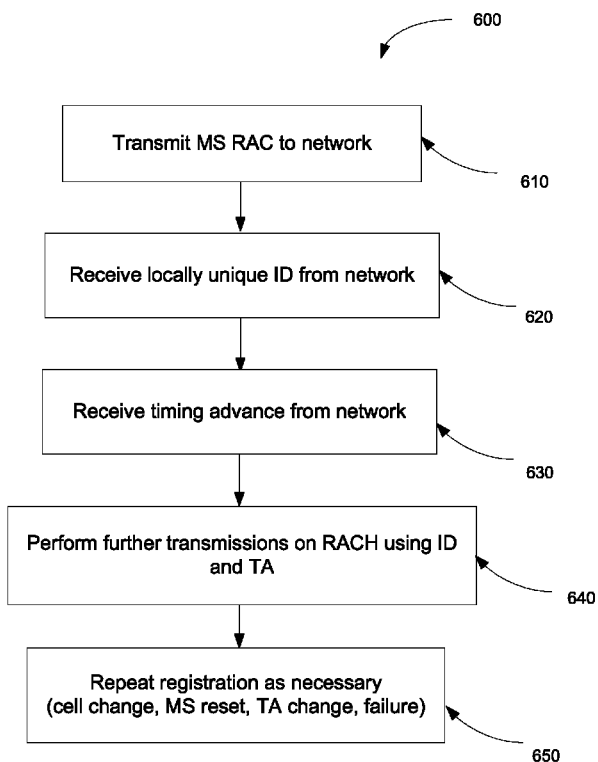
FIG. 6 – Registration using Fast Contention Resolution

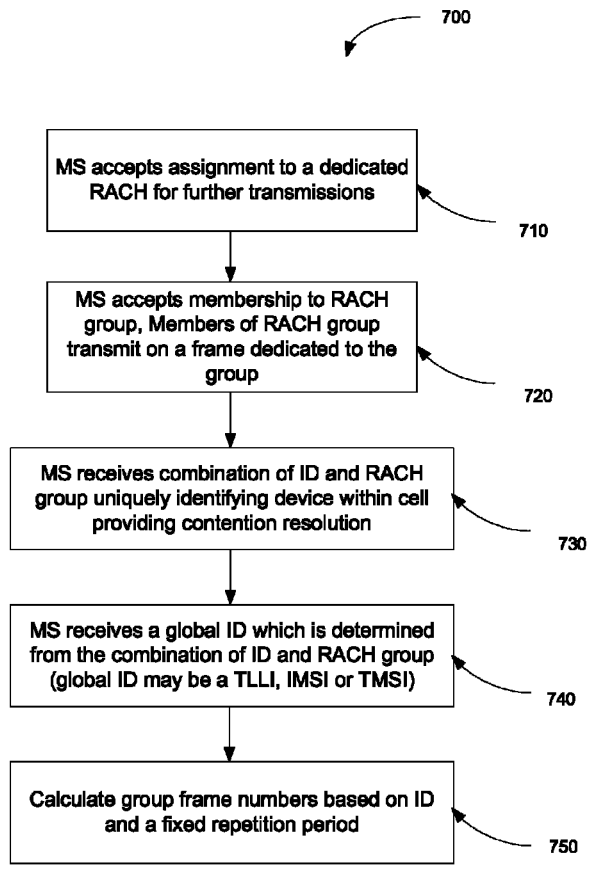
FIG. 7 – Zero Contention Resolution Fixed RACH Allocation

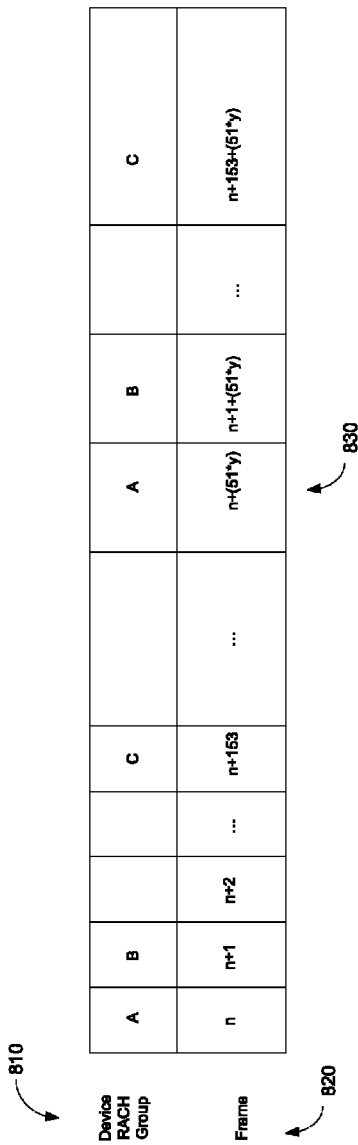
FIG. 8 – Fixed RACH allocation Frame Structure

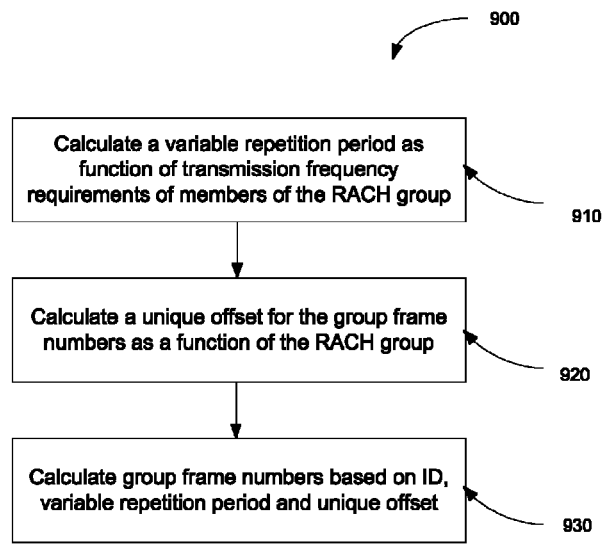
FIG. 9 – Zero Contention Resolution Flexible RACH Allocation

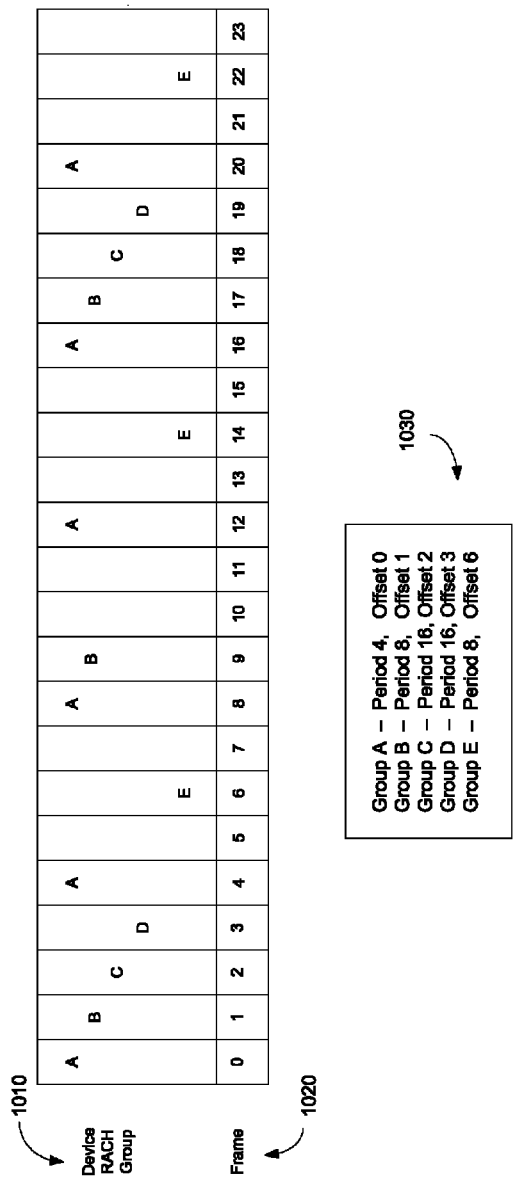
FIG. 10 – Flexible RACH allocation Frame Structure

METHODS AND APPARATUS FOR REGISTRATION AND DATA TRANSMISSION USING FAST/ZERO CONTENTION RESOLUTION

RELATED APPLICATIONS

This patent claims priority to European Patent Application No. 10290130.3, filed Mar. 12, 2010, which is hereby incorporated by reference herein in its entirety.

This application is related to U.S. patent application Ser. Nos. 13/045,125, 13/045,078, 13/045,088, 13/045,099, all of which are filed concurrently herewith, and all of which are hereby incorporated by reference herein in their entireties.

This application is related to European Patent Application Nos. 10290129.5 (docket no. 37466-EP-EPA), 10290131.1 (docket no. 37759-EP-EPA), 10290128.7 (docket no. 37760-EP-EPA), 10290132.9 (docket no. 37760-1-EP-EPA), 10290133.7 (docket no. 37760-2-EP-EPA), all of which were filed on Mar. 12, 2010, and all of which are hereby incorporated by reference herein in their entireties.

TECHNICAL FIELD

Various embodiments described herein relate to apparatus, and methods associated with wireless communication. Some embodiments relate to Global System for Mobile Communications (GSM) networks including general packet radio service (GPRS) and enhanced GPRS (EGPRS) networks. Some embodiments relate to mobile station (MS) access techniques. Some embodiments relate to communications and data transmissions on a random-access channel (RACH).

BACKGROUND

In the wireless environment where multiple devices can request to access the network at the same time, it is necessary for the network to resolve this contention. Currently a random number may be included by the device in its initial request in order to minimize the risk of confusion as to which device is being responded to.

There are, however, a limited number of bits available for the random number reference in the request message, so there exists a significantly high probability that multiple devices use the same random number in the same RACH time slot and that there will be a contention that should be resolved to avoid having multiple devices transmitting on the same dedicated channel. A device which loses a contention resolution (i.e. discovers that it has been transmitting on resources that were not intended for it) may have consumed significant power and incurred delay in transmitting data which was not processed or forwarded by the network. Thus a need exists for an efficient method for contention resolution in terms of time, power consumption and signaling overhead in a wireless network.

BRIEF DESCRIPTION OF THE DRAWINGS

FIG. 1 illustrates a base station and mobile stations of a wireless network in accordance with some embodiments;

FIG. 2 illustrates the timing of an access burst transmission by a mobile station when a timing advance is not known;

FIG. 3 illustrates a legacy access burst structure;

FIG. 4 illustrates a functional block diagram of a mobile station in accordance with some embodiments; and FIG. 5 illustrates a procedure for fast contention resolution in accordance with some embodiments.

FIG. 6 illustrates a procedure for registration with fast contention resolution in accordance with some embodiments.

FIG. 7 illustrates a procedure for zero contention resolution with fixed RACH allocation in accordance with some embodiments.

FIG. 8 illustrates a fixed RACH allocation frame structure in accordance with some embodiments.

FIG. 9 illustrates a procedure for zero contention resolution with flexible RACH allocation in accordance with some embodiments.

FIG. 10 illustrates a flexible RACH allocation frame structure in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a wireless network in accordance with some embodiments. Wireless network 100 includes a base station (BS) 104 and one or more mobile stations or other communication devices 102. In some embodiments, the wireless network 100 may be a GSM network, including a GPRS or an EGPRS network, although this is not a requirement. In accordance with some embodiments, a communication device, such as mobile station 102, may be configured for transmitting small amounts of data infrequently (for example, machine type communications (MTC)) on a RACH 105. The mobile station 102 may perform an initial access on the RACH 105 when a timing advance (TA) may be known by the mobile station 102. In these embodiments, the initial access may comprise transmitting an initial access burst 103 that includes at least one of an identifier that may be used to identify the mobile station 102 and user data. User data is data other than control data and other information conventionally included on a RACH. User data has a network destination (i.e., beyond the base station or base station controller). In some embodiments the identifier may be a shortened identifier.

The timing advance may be an amount of time (or estimate thereof) that the mobile station 102 may advance its transmission of the initial access burst 103 so that the initial access burst 103 is received by the base station 104 within a single time slot of the RACH 105 (i.e., rather than across more than one time slot which may result when the timing advance is unknown). The timing advance depends on the signal propagation delay between the mobile station 102 and the base station 104. The timing advance may be a timing advance that is associated with a serving cell. In some embodiments, the timing advance may be applied to any transmitted burst desired to be received within a time period (e.g. time slot) of a time-division multiplexed uplink channel.

In some embodiments, the parameters defining the RACH 105 that are transmitted in the notification 101 may include among other things, indication of the time slots of a physical channel that comprise the RACH 105. In these embodiments, the mobile station may transmit the initial access burst 103 to include a shortened identifier. The shortened identifier may be used to identify the mobile station 102. These embodiments are discussed in more detail below.

Because the RACH 105 is a random-access channel in which mobile stations 102 are not assigned specific channel resources thereon for transmission of initial access bursts 103, collisions may occur. Embodiments discussed in more detail below may reduce or eliminate the probability of such collisions.

Data transmitted in the initial access burst 103 on the RACH 105 may have a network destination within the communication network 100 rather than for use by base station 104. The use of the RACH 105 for the transmission of smaller amounts of data, as in MTC, may result in a significant reduction in the amount of network resources that are conventionally used for transmission of data. In these embodiments, the signaling conventionally required for channel resource requests may be reduced or eliminated and a temporary block flow (TBF) may not need to be established. In some embodiments discussed in more detail below, the signaling and network resources associated with acknowledgements may also be reduced or eliminated.

The RACH 105 is an uplink-only channel in which access is contention-based and access may not require a known timing advance. With contention-based access, mobile stations 102 may autonomously select when to transmit on the RACH 105 and there may be no device-specific scheduling. Access on the RACH 105 may assume the timing advance is not known. Contention-based access on RACH 105 permits mobile stations 102 to trigger a request for uplink resources based on requirements (rather than, for example, being scheduled periodic uplink resources which may not be needed). With contention-based access, there may be a risk that two or more mobile stations 102 will transmit overlapping access bursts.

FIG. 2 illustrates a transmission by a mobile station when a timing advance is not known. A transmission 202 from base station 104 may be received by mobile station 102 after a one-way signal propagation delay 211. Because a mobile station 102 may synchronize its timebase 203 (an observed timebase) with transmissions received by the base station 104, the transmission 202 may be received within a single time slot at the mobile station 102. A transmission 204 from the mobile station 102 to the base station 104, on the other hand, may be received at the base station 104 within more than one time slot 205 because the timing advance value is not known by the mobile station 102. Accordingly, during a conventional initial access phase, a mobile station 102 may transmit access request messages 109 (FIG. 1) using conventional access bursts with additional guard bits to mitigate the unknown propagation delay at the mobile station 102. As a result, a conventional access burst on RACH 105 may be limited in the amount of useful information that may be included therein due to this long guard period. In GSM and EDGE networks, this amount of useful information may be limited to eight or eleven bits.

Transmission 202 may be a normal-burst transmission from the base station 104 and may be used by the mobile stations 102 to synchronize its time-base 203, although this is not a requirement. The mobile stations 102 may use other base station transmissions, such as synchronization transmissions from the network, to synchronize their time-base 203.

The network may determine and assign a timing advance value to a mobile station 102 after the initial access procedure which may be part of an initial timing advance estimation procedure so that subsequent communications on the control and data channels are received within designated time slots. In this way, normal bursts may be used and the use of significant guard bits can be avoided. The network may also regularly update the timing advance value based on the timing variance of access bursts sent on the uplink control channel. In case of GPRS and EGPRS configured networks, the timing advance may be updated using packet timing advance control channels (PTCCH) based on the timing variance of access bursts sent on the uplink PTCCH. This is a continuous timing advance update procedure that may require additional signalling. The network may also monitor the delay of normal bursts and access bursts sent by the mobile station 102 on various control channels (e.g., in case of explicit polling by network for the access bursts).

FIG. 3 illustrates a legacy access burst structure. An access burst in accordance with burst structure 320 may be used to request and establish a packet data connection using the RACH channel 105. Burst structure 320 may be used for initial access by transmitting an access request message 109 using the RACH channel 105 when the timing advance is unknown by a mobile station. The synchronization sequence field 322 may be the same for all mobile stations 102 and may be used by the network to evaluate the distance of the mobile station. The data field 324 may contain a predetermined number (e.g., 8 or 11) of information bits depending on the coding scheme used, and the guard time field 326 may be used to help guarantee that the base station 104 can properly receive the data field 324 within the time slot. Burst structure 320 may also include tail bits 328. In GPRS and EGPRS wireless networks, a mobile station 102 may request resources by transmitting an access request message 109, which may be referred to as channel request message or an EGPRS packet channel request message, on the RACH channel 105.

The access request message 109 transmitted on the RACH channel 105 may include information for establishing a subsequent connection in the data field 324 rather than user data having a network destination. For example, data field 324 may include an establishment cause, a request for either one-phase or two-phase access and/or a random reference. Since the data field 324 is part of an access request message 109, the data field 324 does not include user data that has a network destination. User data is data other than control data and other information conventionally included on a RACH. User data has a network destination (i.e., beyond the base station or base station controller). Data field 324 may include data for use only by the base station 104 or a network controller, such as a base station controller (not shown in FIG. 1 for allocating resources (e.g. timeslots, carriers, spreading codes, etc.) for a subsequent transmission of data that may have a network destination.

The conventional access request message 109 may be retransmitted (for example, in case no response is received from the network) up to a maximum number of times which may be indicated by the network in a RACH control parameter information element. The spacing between successive attempts may be configured to reduce or minimize collisions with other mobile stations. After transmitting an access request message 109, a mobile station 102 may listen to a broadcast channel (BCCH) and to a downlink common control channel time slot for an immediate assignment message from the network for assignment of network resources. The network may also send an immediate assignment reject message when no resources are available.

FIG. 4 illustrates a functional block diagram of a mobile station in accordance with some embodiments. Mobile station 400 may include transceiver circuitry 404 and processing circuitry 406. Transceiver circuitry 404 may be coupled to one or more antennas 408 for transmitting and receiving signals from base stations, such as base station 104 (FIG. 1). Mobile station 400 may be suitable for use as any of mobile stations 102 (FIG. 1) as well as base station 104.

In accordance with some embodiments, the mobile station 400 may be configured to transmit data on a random access channel. In these embodiments, the processing circuitry 406 may configure an initial access burst, such as initial access burst 103 (FIG. 1), for transmission on a RACH, such as RACH 105 (FIG. 1). The initial access burst may include at least one of a shortened identifier and data having a network destination and may be configured to be no greater than a single time slot of the RACH 105. When the timing advance is known, the transceiver circuitry 404 may transmit the initial access burst 103 with a timing advance, such as timing advance 209 (FIG. 2), to be received within the single time slot of the RACH.

In some embodiments, the shortened identifier that may be included in the initial access burst 103 on the RACH 105 may be determined by either the mobile station 102 or the base station 104 based on a full-length (e.g., a 32-bit) identifier that uniquely identifies the mobile station 102. In these embodiments, the shortened identifier may be based on a 32-bit international mobile subscriber identity (IMSI), a temporary logical link identifier (TLLI), a temporary mobile subscriber identity (TMSI), or some other identifier of the mobile station 102. For example, the shortened identifier may comprise the last 5 bits of the full-length identifier. In these embodiments, the shortened identifier may be determined by either the mobile station 102 or the base station 104.

In some embodiments, the shortened identifier may be substantially shorter than a full-length IMSI or TLLI identifier. In some embodiments, the shorted identifier may be assigned by the network and may be determined based on the particular cell or cell ID. In some embodiments, a partial identifier may be used in combination with a RACH group (discussed below) to identify the mobile station and reduce contention resolution. In some embodiments, a hash function may be used (i.e., a hash of the full-length identifier or a shortened identifier. In some alternate embodiments, the full-length identifier may be used in the initial access burst 103 on the RACH 105.

In some embodiments, the notification 101 may include the shortened identifier for use by the mobile station 102 to identify the mobile station in the initial access burst 103. In these embodiments, the base station 104 may provide a shortened identifier to the mobile station 102 for use on the RACH 105, although this is not a requirement. In some embodiments, the shortened identifier may be provided in addition to or instead of the parameters defining the RACH 105 transmitted in the notification 101.

In some embodiments, mobile station 400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a smart phone, or other device that may receive and/or transmit information wirelessly.

Antennas 408 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 408 may be effectively separated to take advantage of spatial diversity and the different channel characteristics that may result between each of antennas 408 and the antennas of a transmitting station.

Although mobile station 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of mobile station 400 may refer to one or more processes operating on one or more processing elements.

FIG. 5 illustrates a procedure for fast contention resolution in accordance with some embodiments. Procedure 500 may be performed by a mobile station or other device 102. Operation 510 comprises mapping an identifier of the MS to a locally unique identifier that provides contention resolution. In some embodiments, the MS receives the mapped identifier from the BS. In some embodiments, the mobile station has limited or fixed mobility. Operation 520 comprises determining a timing advance for the MS based on a known propagation delay between the MS and the BS. The propagation delay may be known when there is a fixed distance between the MS and BS. In some embodiments the MS receives the timing advance from the BS. Knowledge of the timing advance may allow the MS to use additional bits in the data frame to transmit the identifier. Additionally, in some embodiments where the mobile station may be restricted to a particular cell, the identifier may be defined only within a specific cell permitting the use of fewer bits. Operation 530 comprises transmitting the locally unique identifier of the MS in a portion of an initial transmission on the RACH. The initial transmission is one which may be may be autonomously initiated by the MS. Although the locally unique identifier may be preferable to a global identifier because it uses fewer bits, in some embodiments (operation 540) the locally unique identifier may be a full-length identifier such as a temporary logical link identifier (TLLI) or a temporary mobile subscriber identity (TMSI), and/or may be a globally unique identifier such as an international mobile subscriber identity (IMSI), or some other identifier derived from any of the above.

FIG. 6 illustrates a procedure for registration in fast contention resolution in accordance with an embodiment. Procedure 600 may be performed by a mobile station or other device 102 to register on a network for data services. The data services may include machine type communications (MTC). Operation 610 comprises transmitting a mobile station radio access capabilities (MS RAC) message to the network. The MS RAC contains session characteristic information such as periodicity of transfers and size of data samples. Operation 620 comprises receiving an identification (ID) from the network, which may be locally unique and provides contention resolution. Operation 630 comprises receiving a timing advance from the network. Operation 640 comprises performing further transmissions on a RACH using the ID. At operation 650 this registration procedure may be repeated as necessary, for example, when the MS is served by a different cell, the MS is reset, the timing advance changes or a failure occurs during registration.

In some embodiments this registration may be carried out between the device and the base station rather than at the network level.

FIG. 7 illustrates a procedure for zero contention resolution with fixed RACH allocation, in accordance with some embodiments. Procedure 700 may be performed by a mobile station or other device 102. Operation 710 comprises a mobile station accepting assignment to a dedicated RACH for further transmissions. In some embodiments instants at which the MS is permitted to transmit on this RACH may be substantially aligned with instants at which the mobile station is required to monitor a paging channel. This synchronization may result in reduced power consumption by the MS. At operation 720, the mobile station accepts a membership to an RACH group. A member of an RACH group may be assigned to transmit on a frame on the RACH which is dedicated to the group. At operation 730 the mobile station receives a combination of the ID and the RACH group which may uniquely identify the device within the cell or a cluster of cells or the network, providing contention resolution. At operation 740, the mobile station receives a global identifier for the device which may be determined from the combination of ID and RACH group. In some embodiments, this global identifier may be a temporary logical link identifier (TLLI), an international mobile subscriber identity (IMSI), or a temporary mobile subscriber identity (TMSI). At operation 750 the group frame numbers are calculated based on the ID and a fixed repetition period. In some embodiments, the fixed repetition period may be an integer multiple of 51. In some embodiments, the RACH group has a maximum membership of $2^{(n-1)}$, where n is the number of bits in the random number reference of the access burst.

In some embodiments, the mobile station may determine the RACH group and/or the ID autonomously. For example, the RACH group and ID may be based on the IMSI and the MS may not then need to receive the RACH group and ID from the network.

FIG. 8 illustrates a fixed RACH allocation frame structure in accordance with some embodiments. The top row 810 designates the device RACH groups by letter. The bottom row 820 designates the sequentially increasing frame numbers. As can be seen, RACH groups may repeat periodically in some embodiments, as illustrated at 830, the fixed repetition period may be an integer multiple of 51.

In some embodiments, the device may be the only member of the RACH group, which enables the network to identify the device based solely on membership in the RACH group.

In some embodiments, if the device fails to access the network after a certain number of attempts, the device may fall back to repeating the registration using the legacy RACH network access procedure.

FIG. 9 illustrates a procedure for zero contention resolution with flexible RACH allocation, in accordance with some embodiments. Procedure 900 may be performed by a mobile station or other device 102. This procedure is similar to that illustrated in FIG. 7, except that the repetition period is variable and may be advantageous for devices with non-periodic access or data transfer needs. At operation 910 the variable repetition period may be calculated as a function of the transmission frequency requirements of the members of the RACH group. Additionally, at operation 920, a unique offset may be calculated for the group frame numbers as a function of the RACH group. At operation 930 the group frame numbers are calculated based on the ID, variable repetition period and unique offset.

FIG. 10 illustrates a flexible RACH allocation frame structure in accordance with some embodiments. The top row 1010 designates the device RACH groups by letter. The bottom row 1020 designates the sequentially increasing frame numbers. RACH group frame numbers are calculated based on their period and offset with examples shown at 1030. For example, RACH group A has a period of four with an offset of zero, and thus uses frames 0, 4, 8 etc. Likewise, RACH group B has a period of eight and an offset of one, and thus uses frames 1, 9, 17 etc.

Although the individual operations of procedure 500, 600, 700 and 900 are illustrated and described as separate operations, one or more of the individual operations may be performed concurrently, and nothing requires that the operations be performed in the order illustrated. Furthermore, some operations may be optional.

Embodiments may be implemented in one or a combination of hardware, firmware and software. Embodiments may also be implemented as instructions stored on a computer-readable storage medium, which may be read and executed by at least one processor to perform the operations described herein. A computer-readable medium may include any tangible medium for storing in a form readable by a machine (e.g., a computer). For example, a computer-readable medium may include read-only memory (ROM), random-access memory (RAM), magnetic disk storage media, optical storage media, and flash-memory devices.

Although many embodiments described herein relate to GSM networks, including GPRS and EGPRS networks, embodiments are generally applicable to any wireless network that uses a TDMA random-access channel.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a device for transmission on a random-access channel (RACH) comprising:
   transmitting a mobile station radio access capabilities (MS RAC) message to a network;
   receiving an identification (ID) assigned by the network subsequent to the MS RAC, the ID being locally unique and providing contention resolution;
   determining a timing advance (TA);
   performing further transmissions on the RACH using the ID and the TA; and
   receiving an assignment of membership to a RACH group, wherein a member of the RACH group is assigned to transmit on a frame on the RACH, the frame dedicated to the RACH group.

2. The method of claim 1 wherein the transmitting is from the device to a base station (BS) serving a cell and the receiving is from the BS to the device.

3. The method of claim 1 wherein the method is performed for registration on the network and the method is repeated when:
   the device is served by a different cell;
   the device is reset;
   the registration has failed; or
   the timing advance has changed.

4. The method of claim 3 wherein the registration is for data services.

5. The method of claim 1 further comprising receiving an assignment to the RACH dedicated to the device for the further transmissions.

6. The method of claim 1 further comprising receiving a combination of the ID and the RACH group, the combination uniquely identifying the device within the cell and providing contention resolution.

7. The method of claim 6, further comprising receiving a global identifier for the device, wherein the global identifier is determined from the combination.

8. The method of claim 7 wherein the global identifier comprises an international mobile subscriber identity (IMSI).

9. The method of claim 1 further comprising calculating group frame numbers as a function of the ID and as a function of a fixed repetition period.

10. The method of claim 1 wherein the RACH group has a maximum membership of 2^(n−1) where n is a number of bits in a random number reference in an access burst.

11. The method of claim 1 further comprising calculating group frame numbers as a function of the ID and as a function of a variable repetition period.

12. The method of claim 11 wherein the variable repetition period is a function of transmission frequency requirements of the members of the RACH group.

13. The method of claim 11 wherein the calculating group frame numbers applies a unique offset as a function of the RACH group.

14. A device comprising:
a transceiver coupled to a processor;
the processor configured to:
transmit a mobile station radio access capabilities (MS RAC) message to a network;
receive an identification (ID) assigned by the network subsequent to the MS RAC, the ID being locally unique and providing contention resolution;
determine a timing advance (TA); and
perform further transmissions on a random-access channel (RACH) using the ID and the TA without performing contention resolution.

15. A device as defined in claim 14, wherein the ID being locally unique comprises the ID being locally unique in a cell of the network.

16. A device comprising:
a transceiver coupled to a processor;
the processor configured to:
transmit a mobile station radio access capabilities (MS RAC) message to a network;
receive an identification (ID) assigned by the network subsequent to the MS RAC, the ID being locally unique and providing contention resolution;
determine a timing advance (TA);
perform further transmissions on a random-access channel (RACH using the ID and the TA;
and determine group frame numbers associated with a RACH group as a function of the ID and as a function of a fixed repetition period.

17. A device as defined in claim 16, wherein the ID being locally unique comprises the ID being locally unique in a cell of the network.

18. A device comprising:
a transceiver coupled to a processor;
the processor configured to:
transmit a mobile station radio access capabilities (MS RAC) message to a network;
receive an identification (ID) assigned by the network subsequent to the MS RAC, the ID being locally unique and providing contention resolution;
determine a timing advance (TA);
perform further transmissions on a random-access channel (RACH) using the ID and the TA;
and determine group frame numbers associated with a RACH group as a function of the ID and as a function of a variable repetition period that is a function of transmission frequency requirements of members of the RACH group.

19. A device as defined in claim 18, wherein the ID being locally unique comprises the ID being locally unique in a cell of the network.

20. A device as defined in claim 14, wherein the processor is further configured to receive an assignment of membership to a RACH group, wherein a member of the RACH group is assigned to transmit on a frame on the RACH, the frame dedicated to the RACH group.

* * * * *